United States Patent
Weng et al.

(10) Patent No.: US 6,993,670 B2
(45) Date of Patent: Jan. 31, 2006

(54) METHOD OF CONFIGURING A COMPUTER SYSTEM CAPABLE OF BEING WOKEN UP ON LAN

(75) Inventors: Chih-Hsien Weng, Miaoli (TW); Wen-Hsu Huang, Changhua (TW); Cheng-Yuan Wu, Putz (TW)

(73) Assignee: Via Technologies, Inc., Taipei (TW)

( * ) Notice: Subject to any disclaimer, the term of this patent is extended or adjusted under 35 U.S.C. 154(b) by 523 days.

(21) Appl. No.: 10/156,186

(22) Filed: May 29, 2002

(65) Prior Publication Data

US 2002/0194512 A1    Dec. 19, 2002

(30) Foreign Application Priority Data

Jun. 18, 2001    (TW)    ................................ 90114778 A

(51) Int. Cl.
*G06F 1/32*    (2006.01)
(52) U.S. Cl. ........................... 713/323; 713/322; 713/1
(58) Field of Classification Search ................ 713/300, 713/322, 323, 324, 500; 370/908, 912
See application file for complete search history.

(56) References Cited

U.S. PATENT DOCUMENTS

| | | | | |
|---|---|---|---|---|
| 6,163,849 A | * | 12/2000 | Nouri et al. | ................. 713/324 |
| 6,496,938 B1 | * | 12/2002 | Fry et al. | .................... 713/322 |

* cited by examiner

*Primary Examiner*—Thuan Du
(74) *Attorney, Agent, or Firm*—Rabin & Berdo, P.C.

(57) ABSTRACT

A method of configuring a computer system capable of being woken up on a LAN A core power is actuated for an interval by performing a Pre-Advanced Configuration and Power Interface (Pre-ACPI) routine. Next, a PCI clock signal is retrieved in the fixed interval and then an Ethernet ID is loaded using the PCI clock signal, so as to set a south bridge to a standby mode capable of receiving a wake-up event. As a result, use of an oscillator in conventional methods can be reduced, and the computer system can be configured to be capable of being woken-up on LAN, without requiring the start-up procedure, so that the computer system may be awoken on the LAN even after an abnormal shutdown.

23 Claims, 3 Drawing Sheets

METHOD OF CONFIGURING A COMPUTER SYSTEM CAPABLE OF BEING WOKEN UP ON LAN

This application incorporates by reference Taiwan application Serial No. 090114778, filed on Jun. 18, 2001.

BACKGROUND OF THE INVENTION

1. Field of the Invention

The invention relates in general to a method of configuring a computer system capable of being woken up on LAN, and in particular, to a method of directly configuring a computer system capable of being woken up on LAN, without needing to perform a start-up procedure.

2. Description of the Related Art

In the past few years, the Microsoft Corporation has developed the mechanism of wake-up on LAN (WOL), so that the network system administrator can wake up a computer system of another host via a remote server. To achieve this function, the network interface card (NIC) equipped in the computer system must include the ability to be woken up by the remote server.

Generally, the power supply of a personal computer is divided into two types, core power and suspend power. When the computer is plugged in to an alternating current (AC) source, the suspend power immediately supplies power to the computer system, although the power switch of the computer has not been turned on yet. Additionally, when the computer is in a sleep mode, only the suspend power provides power to the computer system. After starting up, if the computer system detects some devices in the non-use mode, the system will set these devices to the suspend mode, so that the suspend power, instead of the core power, supplies power to the devices, in order to reduce power consumption.

When the computer is started up, the Basic Input/Output System (BIOS) executes a Pre-Advanced Configuration and Power Interface (Pre-ACPI) routine and an ACPI routine, so as to adequately perform power management of the computer system. Then the operation system can turn off some peripheral devices not in use, or enable the system to fall into the sleep mode. When a user presses the keyboard or moves the mouse of the computer, the ACPI routine will automatically enable the computer to obtain the supply of the core power again.

Referring to FIG. 1, it is a sketch diagram of a conventional NIC. The conventional NIC 100 comprises a medium access control (MAC) unit 102, a peripheral component interconnect (PCI) control circuit 104, and an electrically erasable programmable read only memory (EEPROM) 106. The MAC unit 102 is employed for controlling the access actions of packets of the NIC 100, and the PCI control circuit 104 is used for controlling the communication of the NIC 100 to a computer host via PCI bus 108. The EEPROM 106 is employed for storing an Ethernet identity (ID) of the NIC 100.

In the conventional NIC 100, the electrical power for both of the PCI control circuit 104 and the MAC unit 102 is supplied by the core power CP or the suspend power SP. When the computer is plugged in, the system is connected to the AC electrical power. However, before the power switch of the computer system has been turned on, the power of the PCI control circuit 104 and MAC unit 102 is provided by the suspend power SP. And after the computer system is turned on, the PCI control circuit 104 and the MAC unit 102 simultaneously receive electrical power supplied from the core power CP. When the computer is in the sleep mode, the system switches the power supply of the PCI control circuit 104 and MAC unit 102 from core power CP to suspend power SP, in order to reduce the power consumption, wherein, the change of power supply can be achieved by a switch apparatus 112.

In the conventional NIC 100, the MAC unit 102 should firstly load the Ethernet ID stored in the EEPROM 106 when the MAC unit 102 is set to a wakeup-on-LAN mode, which enables NIC 100 capable of being waken up on LAN. Before the computer has been turned on, the clock signal of the computer system has not been generated because the computer system, in which the south bridge 110 is equipped, has not been started up yet. At this time, if the MAC unit 102 tries to load an Ethernet ID from the EEPROM 106, an additional oscillator 114 is required by the prior art to provide the necessary clock signal for loading the Ethernet ID in the EEPROM 106. However, the oscillator 114 requires additional cost.

A remote system can send a magic packet or a pattern match packet through the network to the NIC 100 to wake up the local computer. If the NIC 100 has been set to the wakeup-on-LAN mode, the MAC unit 102 immediately sends a wake-up event signal to the south bridge 110 to wake up the computer system when receiving the magic packet or pattern match packet. The above magic packet was proposed by the AMD Corporation and the pattern match packet was proposed by the Microsoft Corporation. The latter is further characterized by its user programming capability.

In addition, before the south bridge 110 is set to a standby mode capable of receiving the wake-up event signal sent by the MAC unit 102, the BIOS should firstly perform the ACPI routine of the start-up procedure. That is, setting the south bridge 110 is achieved just after a user turns on the computer and the computer system begins to perform the start-up procedure. The setting process requires greater electric current than the suspend power can support, and therefore must be supplied by the core power CP. As a result, traditionally, before the computer is switched on, the south bridge 110 cannot respond to the wake-up event signal sent by the MAC unit 102 and the computer system cannot be woken up on the LAN. Therefore, if the computer system never performs the start-up routine, i.e. has never been booted up, it cannot be awaken on the LAN in the prior art.

Furthermore, if a computer, that has fulfilled the start-up routine and has been set to the wakeup-on-LAN mode, is abnormally turned off, such as a computer crash or power failure, then the BIOS will not be able to successfully set the NIC 100 to the wakeup-on-LAN mode. At the moment, although the suspend power is still active, the computer cannot be woken up by remote magic packets or pattern match packets. The only solution to enable the computer system including the wakeup-on-LAN function is to restart the computer and to reset the south bridge.

The power status of the PCI apparatus includes the D0 state, D1 state, D2 state, and D3 state. The following descriptions focus on the D0 and D3 states. When the computer system is started up and in normal action state, the NIC 100 is in the D0 state. When the computer system shuts down or enters in the sleep mode, the BIOS sets the NIC 100 sequentially to the D1 state, D2 state, and D3 state, so as to enable the MAC 102 to include the wakeup-on LAN function. At the moment, the Ethernet ID loaded into the MAC unit 102 is still kept in the NIC 100, and the NIC 100 can still be woken up on LAN.

In contrast, when the computer is abnormally turned off, the NIC remains in the D0 state because it is too late for the BIOS to set the related setting of the NIC 100 in the sleep mode. That is, the NIC 100 has been not set to the wakeup-on-LAN mode yet. However, abnormal shutdown or power failure causes the loss of the Ethernet ID that was loaded into the MAC unit 102, and the NIC 100 does not have the ability to receive the magic packet, so that the computer system does not have the wakeup-on-LAN function.

SUMMARY OF THE INVENTION

It is therefore an object of the invention to provide a method can reduce an oscillator used in the conventional methods and without requiring the start-up procedure. Furthermore, the invention can solve the problem of computer system not capable of being woken up on LAN because of an abnormal shutdown.

The invention achieves the aforementioned objects by providing a method of configuring a computer system capable of being woken up on LAN. The method firstly actuates a core power for an interval by performing a Pre-Advanced Configuration and Power Interface (Pre-ACPI) routine without booting up the computer system, in response to connection of a power source to the computer system when the computer system is not on. Next, the method retrieves a PCI clock signal in the fixed interval and then loads an Ethernet ID using the PCI clock signal, so as to set a south bridge to a standby mode capable of receiving a wake-up event.

Other objects, features, and advantages of the invention will become apparent from the following detailed description of the preferred, but non-limiting, embodiments. The following description is made with reference to the accompanying drawings.

DETAILED DESCRIPTION OF THE INVENTION

The traditional network interface card (NIC) requires the additional use of an oscillator to set a computer system to a wakeup-on-LAN mode, and to set the south bridge of the computer system to a standby mode capable of receiving a wake-up event signal sent from a medium access control (MAC) unit. However, in the present invention, after the computer system connects to an AC electrical power source, before the computer has been started up yet, the basic input/output system (BIOS) performs a Pre-Advanced Configuration and Power Interface (Pre-ACPI) routine. The BIOS activates the south bridge chip for a short period to utilize the peripheral component interconnect (PCI) clock signal to load an Ethernet identity (ID) in an electrically erasable programmable read only memory (EEPROM), so as to initialize the NIC to the wakeup-on-LAN mode. As a result, the invention requires no additional oscillator, and thus, reduces the cost.

Accordingly, the advantage of the invention is that, for a new computer, after plugging in the computer at the first time, the computer could be set to the wakeup-on-LAN mode, so that the computer could be woken up remotely. Therefore, the new computer could be woken up by a network and perform all kinds of related setting. In addition, the MAC unit and PCI control unit of the NIC disclosed by the invention could receive different electrical powers, or the same power. Furthermore, the BIOS used in the invention has to be modified correspondingly.

The method of configuring a computer system capable of being woken up on LAN could use a NIC with one power domain or two power domains. The computer system indicates the states of core power and suspend power by two power-detecting signals, which are a PCI reset signal, PCIRST, and a PCI power good signal, PCIPWGD. The two designs of the network interface cards are respectively described below.

Figure 1:
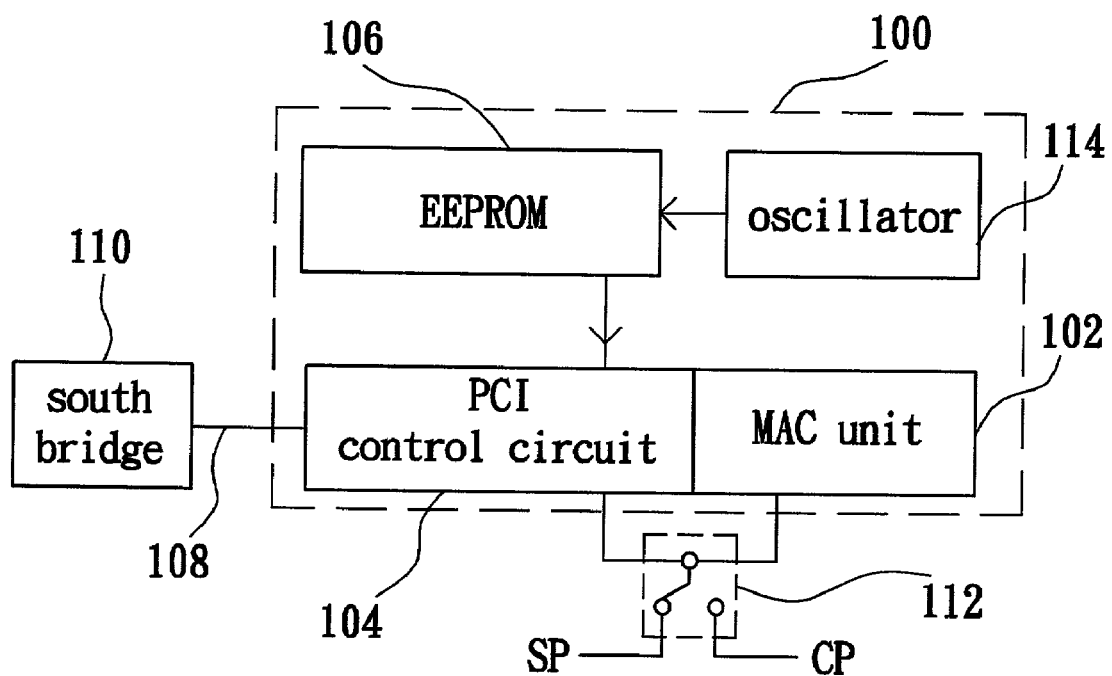
FIG. 1 (Prior Art) is a sketch diagram of a conventional network interface card (NIC).
Figure 2A:
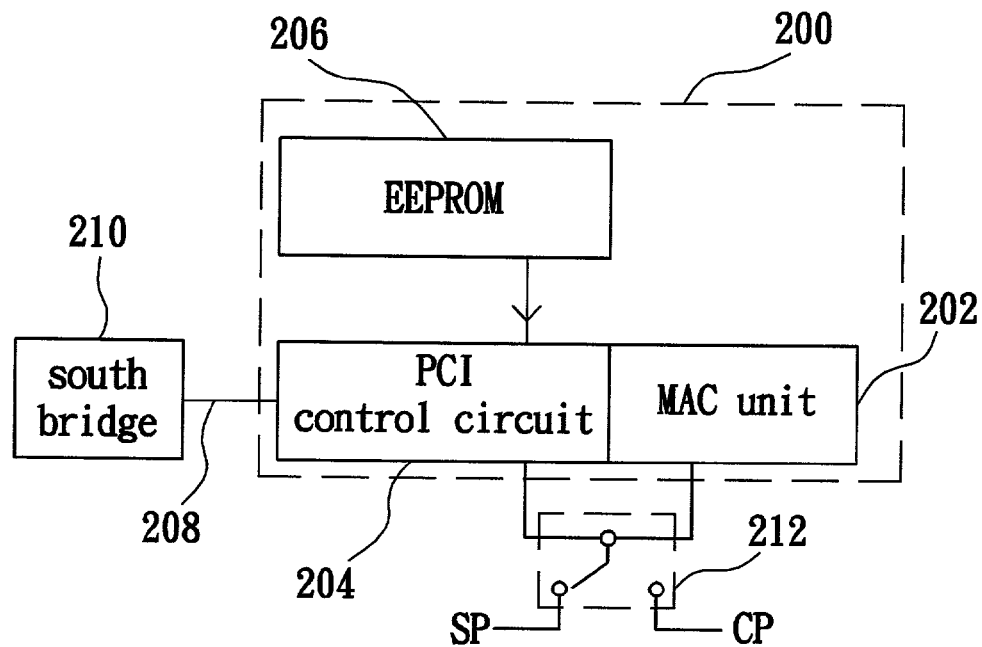
FIG. 2A is a sketch diagram of a NIC with one power domain.

Referring to FIG. 2A, it is a sketch diagram of a NIC with one power domain. The NIC 200 includes a MAC unit 202, a PCI control circuit 204, and an EEPROM 206. The MAC unit 202 is employed for controlling access action of packets of the MC 200. The PCI control circuit 204 allows the NIC 200 to communicate with a computer host via the PCI bus 208. And the EEPROM 206 stores an Ethernet ID of the NIC 200. When receiving a magic packet or pattern match packet, the MAC 202 immediately sends a wake-up event signal to the south bridge 210 to wake up the computer system. The power supply of the PCI control circuit 204 and MAC unit 202 of the NIC 200 could be from the core power or suspend power, wherein the control switch 212 could be used to select the proper power source.

After the computer is plugged in to the alternating current (AC) source, the PCI control circuit 204 and MAC unit 202 can obtain the suspend power SP prior to turning on the power switch of the computer system. Meanwhile, south bridge chip is initialized to be capable of receiving a wake-up event and, for example, generates a PCI reset signal to initialize the NIC as the wakeup-on-LAN mode. It should be noted that initializing south bridge chip to be capable of receiving a wake-up event can be implemented by hardware or BIOS. After the power switch of the computer system is turned on, the PCI control circuit 204 and MAC unit 202 immediately receive the core power CP.

In the computer system using the NIC with one power domain, the PCI power good signal PCIPWGD is always logic 1 since the PCI power good signal PCIPWGD responds to the status of the suspend power SP. However the PCI reset signal PCIRST responds to the status of the core power CP. When the computer is abnormally turned off, the signal PCIRST becomes floating or logic 0. The state of the suspend power SP and the core power CP of the current system could be indicated by detecting the PCI power good signal PCIPWGD and PCI reset signal PCIRST.

Figure 2B:
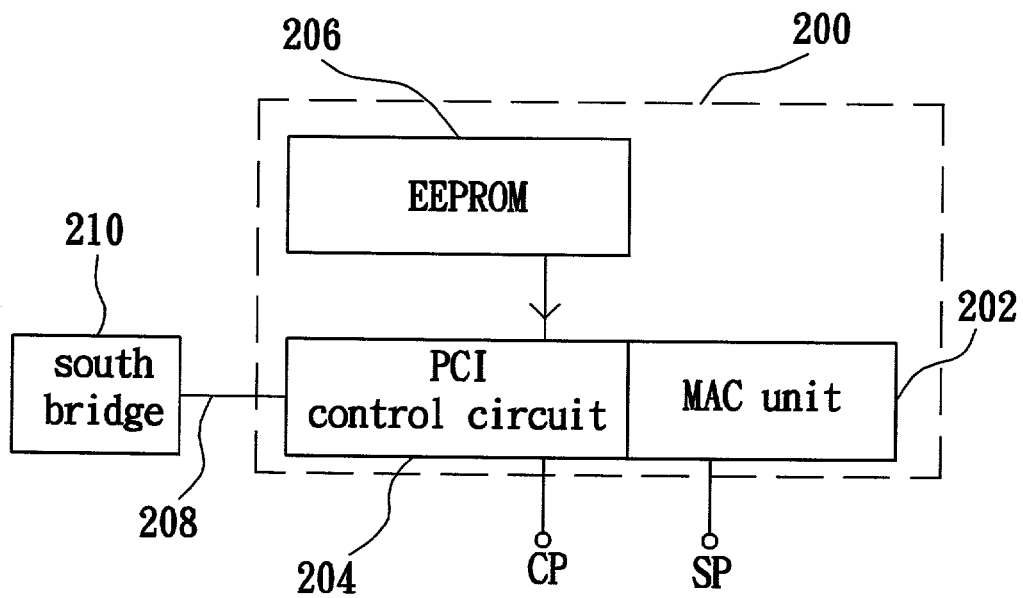
FIG. 2B is a sketch diagram of a NIC with two power domains.

Referring to FIG. 2B, it is a sketch diagram of a NIC with two power domains. The power sources of the PCI control circuit 204 and the MAC unit 202 of the NIC 200 are respectively from the core power CP and the suspend power SP. When a plug of the computer is put into an AC electrical outlet, the computer system is connected to alternating power. Before the power switch of the computer is turned on, only the MAC unit 202 of the NIC 200 could receive the power provided from the suspend power SP. Meanwhile, south bridge chip is initialized to be capable of receiving a wake-up event and, for example, NIC 200 generates an internal reset signal to initialize the NIC as the wakeup-on-LAN mode. After turning on the computer, the PCI control circuit 204 could just receive the power from the core power CP. Furthermore, the circuit design for electric-leakage prevention of the NIC with two power domains should be enhanced, so as to avoid electric leakage between the different power sources.

In the computer system using a NIC with two power domains, the PCI power good signal PCIPWGD responds to the status of the core power CP. The PCI power good signal PCIPWGD becomes logic 1 after the computer is turned on, and the signal PCIPWGD is logic 0 after the computer shuts down. However, the PCI reset signal PCIRST responds to the status of the core power CP, and will be floating or logic 0 when the computer is abnormally turned off.

Figure 3:
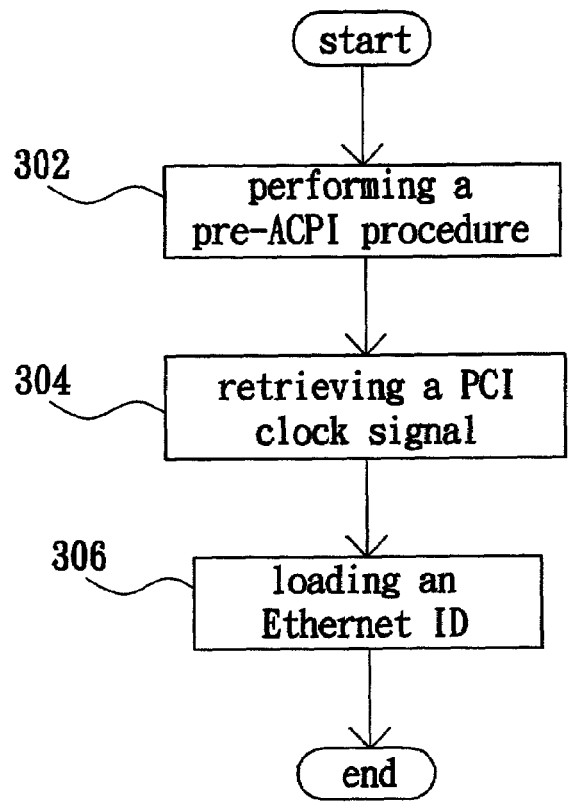
FIG. 3 is a flowchart of the method of configuring a computer system capable of being woken up on LAN according to a preferred embodiment of the invention.

In the BIOS of the computer system of the invention, the setting steps are shown in FIG. 3, which is a flowchart of the method of configuring a computer system capable of being woken up on LAN according to the preferred embodiment of the invention. The setting steps of the invention are performed after the computer connects to the power. First, in the step 302, the method performs the Pre-ACPI routine to turn on the core power CP for a fixed interval, so as to initialize the south bridge 210 to a standby mode capable of receiving a wake-up event signal sent by the MAC unit 202.

Next in the step 304, a PCI clock signal is thus obtained during the fixed interval. Because the south bridge 210 is active, the system clock signal is produced in the computer system. As a result, the MAC unit 202 could obtain the PCI clock signal during the interval.

In the step 306, the method then loads an Ethernet ID, for example, from the EEPROM 206 into the MAC unit 202. Since the MAC unit 202 has loaded the Ethernet ID, it has an ability to receive a magic packet sent by a remote host, so that the computer system enters a wakeup-on-LAN mode.

After the computer system has been set to the mode capable of being woken up by magic packets, the computer system could continue to enter into the sleep mode.

Accordingly, it is not necessary for the method of the invention to perform the start-up procedure to set the south bridge 210. After the computer connects to the AC power, the setting steps of the invention can be performed to set the computer system to the wakeup-on-LAN mode.

When loading the Ethernet ID stored in the EEPROM 206 in this embodiment, the required clock signal could be the PCI clock signal generated by the south bridge activity during the Pre-ACPI routine. The invention further differs from the traditional methods in that it does not need an additional oscillator to provide the required clock signal, and thus, the invention can reduce the cost of the computer system.

Additionally, in the NIC 200 with two power domains, as shown in FIG. 2B, a traditional switch apparatus is not necessary to switch the power supply, because the PCI control unit 204 and the MAC unit 202 respectively use core power CP and suspend power SP. Since the PCI control unit 204 of FIG. 2B uses only the core power CP, the power of the suspend power SP can be enormously saved.

Furthermore, the south bridge 210 includes two pins that are employed for receiving the wake-up event signal. One of the two pins is a ring-in pin and the other is a PME pin, wherein the ring-in pin receives the wake-up event signal sent from an internal NIC and the PME pin receives the signal from an external NIC.

A detecting circuit is further disclosed by the invention so that the MC can be woken up on LAN when the computer system is abnormally turned off, in which case, the NIC of the conventional methods cannot be woken up on LAN. When the above problem happens, the detecting circuit of the invention immediately sets the NIC 200 to the wakeup-on-LAN mode, so that the computer can receive the wake-up signal from a remote host.

Figure 4:
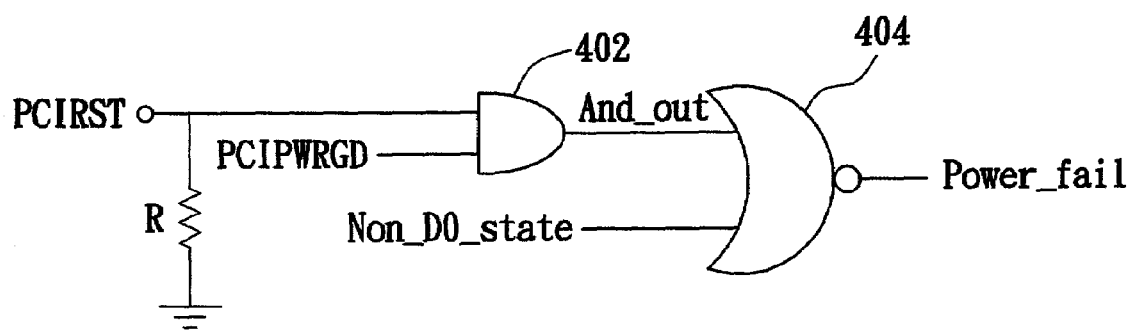
FIG. 4 shows a power detection circuit of a NIC with one power domain or two power domains according to a preferred embodiment of the invention.

Referring to FIG. 4, it shows a power detection circuit of a NIC with one power domain or with two power domains according to a preferred embodiment of the invention. The PCI reset signal PCIRST is inputted into an AND gate 402 via the input terminal of the AND gate 402. The input terminal of the AND gate 402 is further connected to a pull-down resistor R in parallel. The PCI power good signal PCIPWGD is also inputted into the AND gate 402. The output signal And_out of the AND gate 402 and a non-D0-state indicating signal Non_D0_state are both inputted into a NOR gate 404. The NOR gate 404 is employed for outputting a power failure signal Power_fail, so as to indicate whether or not the computer system is in an abnormal shutdown state. If so, the power failure signal Power_fail is logic 1. Wherein, when the NIC is set to the D0 state, the non-D0-state indicating signal Non_D0_state is logic 0. And when the NIC is set to the non-D0 state, such as the D1, D2, or D3 state, the non-D0-state indicating signal Non_D0_state is logic 1.

When the detecting circuit of FIG. 4 is equipped in the computer system, using the NIC with one power domain, the operating concept is briefly described as follows. The computer system could detect the power state by the PCI reset signal PCIRST. Because the PCI power good signal PCIPWGD selectively uses the core power CP or the suspend power SP by the control switch 212 of FIG. 2, the PCI power good signal PCIPWGD is always logic 1. When the computer system is abnormally turned off, the PCI reset signal becomes floating since the PCI reset signal PCIRST corresponds to the core power CP. When the PCI reset signal PCIRST is floating, the input signal of the AND gate 402, to which the PCI reset signal PCIRST corresponds, is pulled low to logic 0 by the pull-down resistor R. Accordingly, when the computer system is abnormally shut down, the output signal And_out of the AND gate 402 turns into logic 0.

In the abnormal shutdown state, if it is too late for the BIOS to reset the NIC to the D1, D2, or D3 state, instead of the D0 state, the NIC remains in the D0 state so that the non-D0-state indicating signal Non_D0_state is logic 0. At this time, because both of the output signal And_out of the AND gate 402 and the non-D0-state indicating signal Non_D0_state are logic 0, the power failure signal Power_fail outputted by the NOR gate 404 turns into logic 1. And when the power failure signal Power_fail is logic 1, the computer system forcibly sets the network interface card 200 to the wakeup-on-LAN mode. As a result, the problem of the conventional NIC with one power domain incapable of waking up the computer system through LAN, due to a power failure, can be effectively avoided via the detecting circuit of FIG. 4.

Accordingly, when the detecting circuit of FIG. 4 is equipped in the computer system, using the NIC with two power domains, the operating concept is briefly described as follows. In this system, because the PCI power good signal PCIPWGD corresponds to the core power CP, the value of the PCI power good signal PCIPWGD is directly detected, so as to recognize whether or not the core power CP has been turned off After the start-up of the computer, the PCI power good signal PCIPWGD is logic 1, and after the power failure, the PCI good signal PCIPWGD is logic 0. When the PCI good signal PCIPWGD is logic 0 and the non-D0-state indicating signal Non_d0_state is logic 0, the output signal And_out of the AND gate 402 is logic 0 and the power failure signal Power_fail is logic 1 so that the computer system forcibly sets the NIC 200 to the wakeup-on-LAN mode. Then, the computer system can be woken up by receiving a magic packet or a pattern match packet. As a result, the disadvantage of the conventional NIC with two power domains incapable of waking up the computer system through LAN due to a power failure, can be effectively avoided via the detecting circuit of FIG. 4.

Although the invention has been illustrated by taking the EEPROM 206 as an example, any volatile memory can be used.

In the above description of the invention, the present invention can reduce an oscillator used in the conventional methods. This invention can initialize the computer as the wakeup-on-LAN (WOL) mode without necessarily requiring the computer start-up procedure. Furthermore, the invention can solve the problem associated with the conventional methods in an abnormal shutdown, wherein an abnormal shutdown renders the computer system incapable of being woken up on LAN.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of configuring a computer system capable of being woken up on a LAN, the method comprising the steps of:
   in response to connection of a power source to the computer system when the computer system is not on, actuating a core power for an interval and performing a Pre-Advanced Configuration and Power Interface (Pre-ACPI) routine, without booting up the computer system; and
   during the interval,
      retrieving a PCI clock signal in the fixed interval,
      loading an Ethernet ID using the PCI clock signal, and
      initializing a south bridge chip to a standby mode capable of receiving a wake-up event.

2. The method according to claim 1, wherein the loading step loads the Ethernet ID into a MAC unit of a network interface card.

3. The method according to claim 2, wherein the network interface card further comprises a PCI control circuit.

4. The method according to claim 3, wherein the network interface card has one power domain, so that both the PCI control circuit and the MAC unit use the core power or a suspend power.

5. The method according to claim 4, wherein the method further comprises, during the interval, generating a power failure signal according to a PCI reset signal, a PCI power good signal, and a non-D0-state indicating signal, so as to indicate whether the computer system is in an abnormal shutdown state.

6. The method according to claim 5, wherein the method further comprises, during the interval, the computer system forcibly setting the network interface card to a wakeup-on-LAN mode when the power failure signal is asserted to indicate that the computer system is in the abnormal shutdown state.

7. The method according to claim 5, wherein the PCI reset signal is pulled down to ground via a resistor.

8. The method according to claim 3, wherein the network interface card has two power domains, so that the PCI control circuit uses the core power and the MAC unit uses a suspend power.

9. The method according to claim 8, wherein the method further comprises, during the interval, generating a power failure signal according to a PCI reset signal, a PCI power good signal, and a non-D0-state indicating signal, so as to indicate whether the computer system is in an abnormal shutdown state.

10. The method according to claim 9, wherein the method further comprises, during the interval, the computer system forcibly setting the network interface card to a wakeup-on-LAN mode when the power failure signal is asserted to indicate that the computer system is in the abnormal shutdown state.

11. The method according to claim 2, wherein said MAC unit generates an internal reset signal to initialize the network interface card as a wakeup-on-LAN mode.

12. The method according to claim 1, wherein the method further comprises, during the interval, generating a power failure signal according to a PCI reset signal, a PCI power good signal, and a non-D0-state indicating signal, so as to indicate whether the computer system is in an abnormal shutdown state.

13. The method according to claim 1, wherein the MAC unit sends the wake-up event to the south bridge chip in response to a magic packet.

14. The method according to claim 1, wherein the MAC unit sends the wake-up event to the south bridge chip in response to a pattern match packet.

15. A computer system equipped with a network interface device, the computer system comprising:
   a bus coupled to the network interface device;
   a chipset coupled to the bus; and
   a system circuit for activating the chipset for an interval using power from a power source without booting up the computer system, the activation in response to connection of the power source to the computer system when the computer system is not on;
   wherein during the interval, the system circuit both sets the network interface device to a mode for enabling the network interface device to be awoken remotely and sets the chipset to a mode for enabling the chipset to receive a wake-up event from the network interface device to wake up the computer system.

16. The computer system according to claim 15, further comprising a logic circuit for generating a power failure signal according to a bus reset signal, a bus power good signal, and a signal indicating whether the computer system is turned-on, so as to indicate whether the computer system is in an abnormal shutdown state.

17. The computer system according to claim 16, wherein the computer system sets the network interface device to a wakeup-on-LAN mode when the power failure signal is asserted to indicate that the computer system is in the abnormal shutdown state.

18. The computer system according to claim 15, wherein the network interface device comprises
   a media access control unit for controlling data access of the network interface device from a network; and a bus control circuit for controlling communication of the network interface device to the computer system via the bus, wherein when the bus control circuit receives a bus clock signal generated by activation of the chipset during the interval, the system circuit sets the network interface device, without the computer system being booted up, to the mode for enabling the network interface device to be awoken remotely from the network.

19. The computer system according to claim 18, wherein the bus clock signal received by the bus control circuit of the network interface device during the interval is used for loading a network identifier of the network interface device into the media access control unit so that the network interface device is enabled to be awoken remotely by data indicative of waking up the computer system from the network.

20. The computer system according to claim 15, wherein the system circuit is a basic input/output system.

21. A method of configuring a computer system to be able to be awoken remotely from a network, wherein the computer system is equipped with a network interface device, the method comprising the steps of:

in response to connection of a power source to the computer system when the computer system is not on, activating a chipset of the computer system for an interval without booting up the computer system;

during the interval, setting the network interface device to a mode for enabling the network interface device to be awoken remotely; and during the interval, setting the chipset to a mode for enabling the chipset to receive a wake-up event from the network interface device to wake up the computer system.

22. The method according to claim 21, wherein when the network interface device receives a bus clock signal generated by activation of the chipset during the interval, the network interface device is set, without the computer system being booted up, to the mode for enabling the network interface device to be woken remotely from the network.

23. The method according to claim 22, wherein the network interface device is set to the mode for enabling the network interface device to be awoken remotely by using the bus clock signal received by the network interface device to load a network identifier of the network interface device into a media access control unit of the network interface device so that the network interface device is enabled to be awoken remotely by data indicative of waking up the computer system from the network.

* * * * *